(12) United States Patent
Lin et al.

(10) Patent No.: US 9,137,743 B2
(45) Date of Patent: Sep. 15, 2015

(54) METHOD AND MOBILE DEVICE FOR AUTOMATICALLY CHOOSING COMMUNICATION NETWORK

(71) Applicant: REALTEK SEMICONDUCTOR CORP., HsinChu (TW)

(72) Inventors: Tsang-Shian Lin, HsinChu (TW); Chin-Yi Lin, HsinChu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 142 days.

(21) Appl. No.: 13/970,267

(22) Filed: Aug. 19, 2013

(65) Prior Publication Data

US 2014/0269504 A1    Sep. 18, 2014

(30) Foreign Application Priority Data

Mar. 15, 2013 (TW) .............................. 102109271 A (51) Int. Cl.
*H04L 12/66* (2006.01)
*H04W 48/18* (2009.01)

(52) U.S. Cl.
CPC ..................................... *H04W 48/18* (2013.01)

(58) Field of Classification Search
CPC ......... H04L 65/00; H04L 65/01; H04L 65/02; H04L 65/03; H04L 2012/64; H04L 2012/65; H04L 2012/66; H04L 2012/67
USPC ........................... 370/328, 229, 230, 351–356
See application file for complete search history.

(56) References Cited

U.S. PATENT DOCUMENTS

| | | | |
|---|---|---|---|
| 2003/0091024 A1* | 5/2003 | Stumer ......................... | 370/352 |
| 2006/0146792 A1* | 7/2006 | Ramachandran et al. .... | 370/352 |
| 2008/0008158 A1 | 1/2008 | Lee | |
| 2008/0168138 A1* | 7/2008 | Simpson ....................... | 709/204 |
| 2010/0015945 A1* | 1/2010 | Shuman et al. ............... | 455/406 |
| 2011/0044321 A1* | 2/2011 | Rosenberg et al. ........... | 370/352 |
| 2011/0256903 A1 | 10/2011 | Paas et al. | |

FOREIGN PATENT DOCUMENTS

CN          102546998 A      7/2012

* cited by examiner

*Primary Examiner* — Dady Chery
(74) *Attorney, Agent, or Firm* — Muncy, Geissler, Olds & Lowe, P.C.

(57) ABSTRACT

A method for automatically choosing a communication network is applicable to a mobile device. When receiving a communication request for a contact from a user interface, a processing unit determines a status of a network card module according to the communication request. When the network card module is enabled, the network card module sends a network packet and receives a corresponding response packet to determine whether the network card module is connected to the Internet. When the network card module is connected to the Internet, the network card module sends an inquiry packet to a voice over internet protocol (VoIP) proxy server and receives a corresponding response packet to determine whether the contact is online. When the contact is online, the network card module carries out the communication request through the VoIP proxy server. Otherwise, the communication request is carried out by a cellular phone module.

16 Claims, 6 Drawing Sheets

METHOD AND MOBILE DEVICE FOR AUTOMATICALLY CHOOSING COMMUNICATION NETWORK

CROSS-REFERENCES TO RELATED APPLICATIONS

This non-provisional application claims priority under 35 U.S.C. §119(a) on Patent Application No. 102109271 filed in Taiwan, R.O.C. on Mar. 15, 2013, the entire contents of which are hereby incorporated by reference.

BACKGROUND

1. Technical Field

The present invention relates to communications technology of a mobile device, and in particular, to a method and a mobile device for automatically choosing a communication network.

2. Related Art

Information transfer and interchange are the motivating forces that drive industrial progress. With the development of various telecommunication products and technologies along with the prevalence of the Internet, communication between individuals has greatly progressed. In the existing communications technology, people can choose among many methods such as using indoor phones, cell phones, instant messaging software, and Internet phones to make a voice call or send a short message, so as to complete synchronous information interchange.

The cost of making a voice call or sending a short message by using the conventional telecommunication network is relatively high; especially when a long-distance call or an international call is to be made.

With the rapid development of wireless communications technology, network communication using low-cost broadband, such as the use of an instant messaging software or an Internet phone, has gradually become a common approach in telecommunication.

For a mobile device such as a smart phone, in addition to the basic functions of a cellular mobile phone, a third-party application (i.e., communication software) can also be installed to provide free Internet phone calls and message transfer services through the network. However, the dialing and message transfer interface provided by the communication software is different from that of the cellular mobile phone, resulting in inconvenience and increased time spent in calling and transferring messages.

SUMMARY

In an embodiment, a method for automatically choosing a communication network includes: receiving a communication request from a user interface; determining a status of a network card module according to the communication request by a processing unit; sending a network packet through the network card module and receiving a response packet corresponding to the network packet to determine whether the network card module is connected to Internet; and sending a first inquiry packet to a voice over internet protocol (VoIP) proxy server by the network card module and receiving a first response packet corresponding to the first inquiry packet to determine whether a contact corresponding to the communication request is online. When the contact is online, the communication request is carried out through the VoIP proxy server by the network card module. When the network card module is not installed, is not enabled, or is not connected to the Internet, the communication request is carried out by a cellular phone module.

In some embodiments, the method for automatically choosing a communication network further includes: sending a second inquiry packet to the VoIP proxy server by the network card module and receiving a second response packet corresponding to the second inquiry packet to determine whether a balance in a VoIP account of a user when the contact is offline. The communication request is carried out through VoIP proxy server by the network card module when the contact is online. The communication request is carried out by a cellular phone module when the network card module is not installed, enabled or connected to the Internet.

In some embodiments, when the contact is offline, the configured value is first checked. When the configured value is set to use the VoIP, the second inquiry packet is sent. When the configured value is set not to use the VoIP, the communication request is carried out by a cellular phone module.

In some embodiments, the step of determining the status of the network card module includes: sending a check signal through the processing unit; checking whether a response signal returned by the network card module according to the check signal is received; and obtaining the status of the corresponding network card module according to the response signal when the response signal is received.

In some embodiments, the communication request is to make a voice call or to send a message to the contact.

In some embodiments, the network card module is a mobile network card module or a wireless network card module.

In some embodiments, the method for automatically choosing a communication network further includes: actuating a confirmation key of the user interface to generate the communication request. The confirmation key may be a phone dialing key or a message transfer key.

In another embodiment, a mobile device for automatically choosing a communication network includes a user interface, a network card module and a processing unit. The user interface is used for sending a communication request. The network card module is used for determining whether the network card module is connected to Internet and for determining whether a contact corresponding to the communication request is online. The processing unit is used for determining a status of the network card module according to the communication request.

The communication request is carried out through a voice over internet protocol (VoIP) proxy server by the network card module when the contact is online, whereas the communication request is carried out by a cellular phone module when the network card module is not installed, enabled or connected to the Internet.

In some embodiments, the network card module sends a network packet and receives a response packet corresponding to the network packet to determine whether the network card module is connected to the Internet.

In some embodiments, the network card module sends a first inquiry packet to the VoIP proxy server and receives a first response packet corresponding to the first inquiry packet to determine whether a contact corresponding to the communication request is online.

In some embodiments, the network card module sends a second inquiry packet to the VoIP proxy server and receives a second response packet corresponding to the second inquiry packet to determine whether a balance in a VoIP account of a user is positive when the contact is offline.

In some embodiments, the communication request is carried out through the VoIP proxy server by the network card module when the balance in the VoIP account is positive whereas the communication request is carried out by the cellular phone module when the balance in the VoIP account is not positive.

In some embodiments, the communication request is to send a message or to make a voice call to the contact.

In some embodiments, the network card module is a mobile network card module or a wireless network card module.

In some embodiments, the mobile device further includes a confirmation key, and the confirmation key is used for enabling the communication request.

In some embodiments, the confirmation key is a phone dialing key or a message transfer key.

To sum up, the method and a mobile device for automatically choosing a communication network according to the present invention is applicable to a mobile device, so that the mobile device has an automatic judging mechanism; in this way, when the user uses the mobile device to communicate with (i.e. made a voice call with or send a message to) a contact, the automatic judging mechanism determines whether the communication is performed through the Internet or through the telecommunication network, and determines that the communication is performed through the Internet in the case that the mobile device can access the Internet.

DETAILED DESCRIPTION

Please refer to FIG. 1 to FIG. 5, in which a method for automatically choosing a communication network is applicable to a mobile device 10. The mobile device 10 includes a user interface 110, a processing unit 130, a cellular phone module 150, and one or more network card modules 170, 172.

Figure 1:
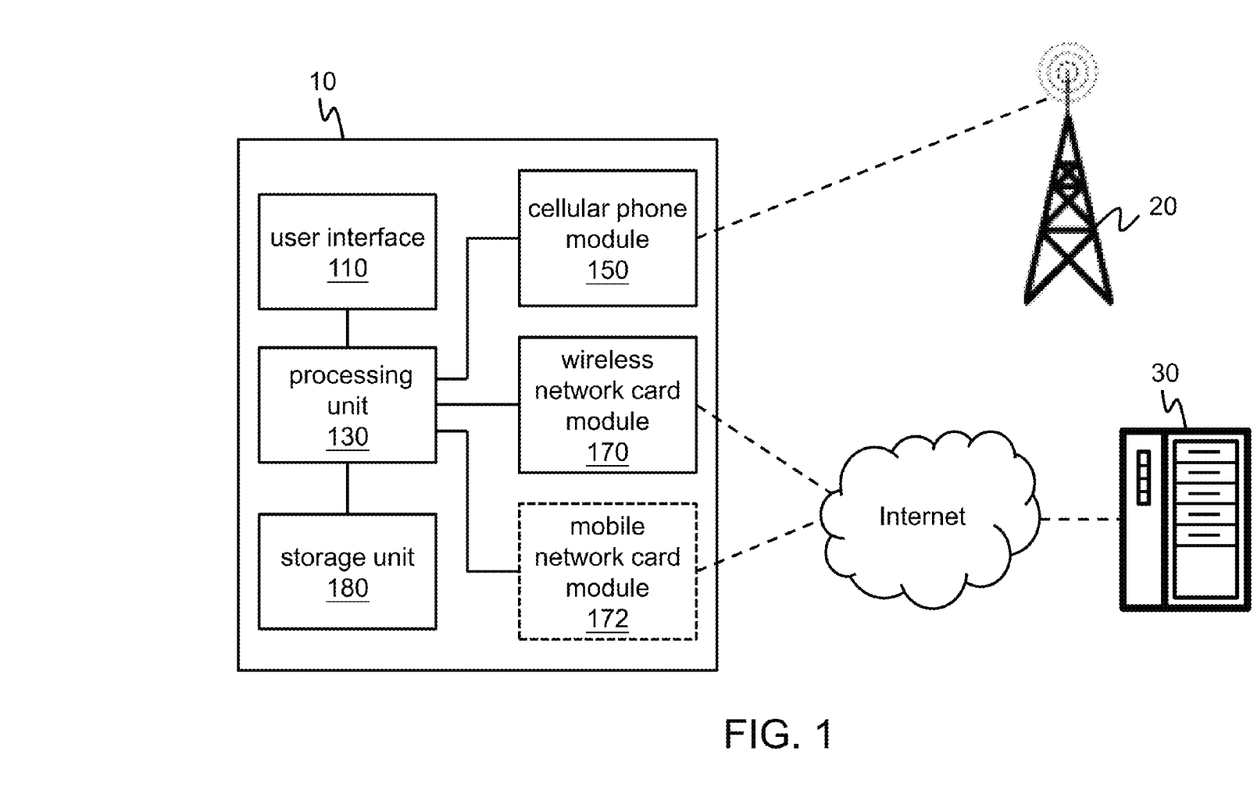
FIG. 1 is a schematic block diagram of a mobile device using a method for automatically choosing a communication network according to an embodiment of the present invention.
Figure 2:
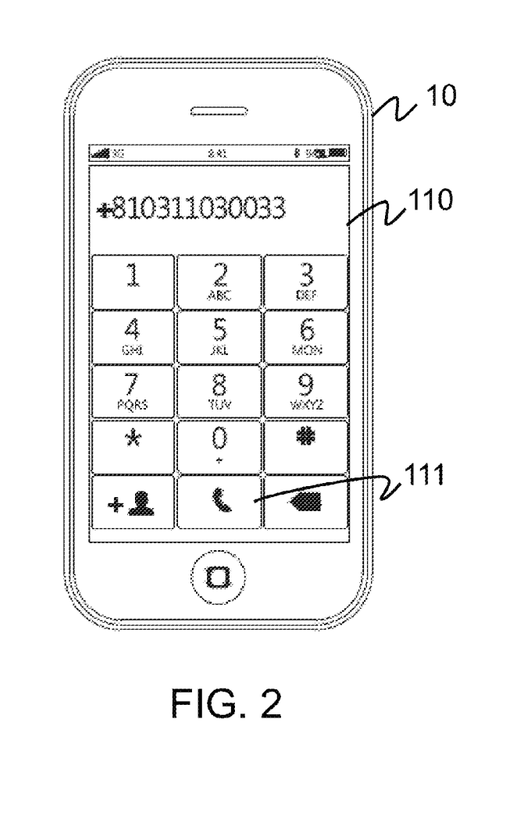
FIG. 2 is a schematic view of an embodiment of an input screen of the user interface in FIG. 1.
Figure 3:
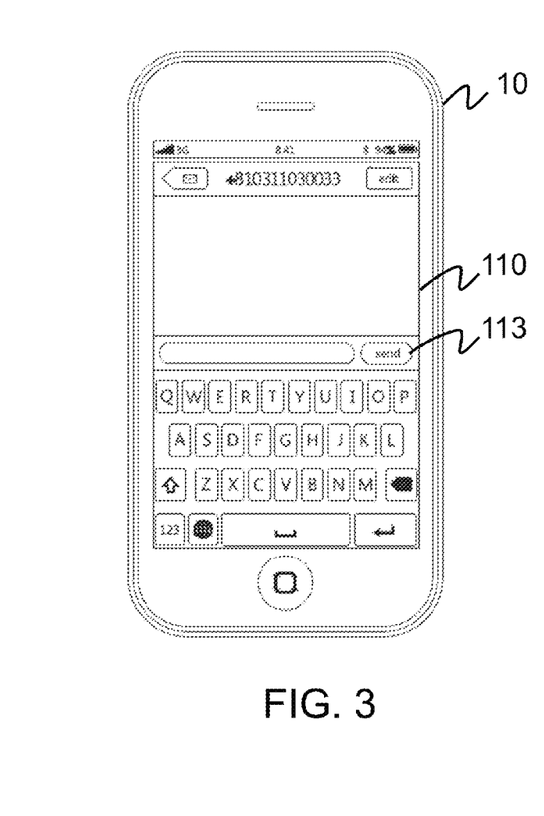
FIG. 3 is a schematic view of another embodiment of an input screen of the user interface in FIG. 1.

The processing unit 130 is electrically connected to the user interface 110, the cellular phone module 150, and the network card modules 170, 172. The user interface 110 is provided for a user to input phone numbers to be dialed or message content to be sent. The message content can be a text short message, a multimedia short message (such as a picture or sound) or a combination thereof.

Therefore, the user interface 110 may be a touch screen, physical keys, or a combination thereof.

Figure 4:
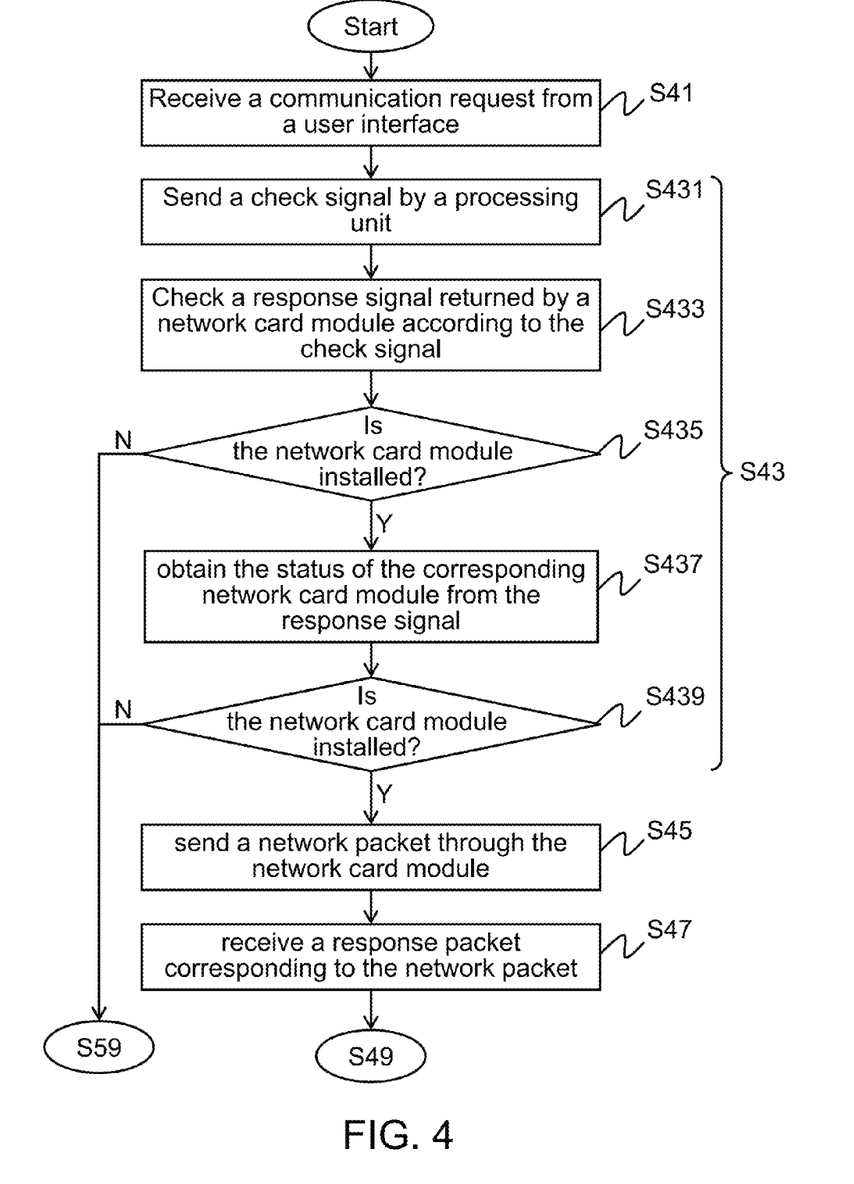
FIG. 4 and FIG. 5 are flow charts of a method for automatically choosing a communication network according to an embodiment of the present invention.

The user inputs the phone numbers to be dialed or message content to be sent by using the user interface 110, and after input, pressed or pat a confirmation key (for example, a dialing key 111 in FIG. 2 or a sending key 113 in FIG. 3), or determines to call or send a message to a contact in a speed dialing manner (for example, pressing a numeric key for a several seconds to dial), or a voice control dialing manner (for example, voice dialing through Bluetooth device, or voice control dialing through voice recognition). At this time, the user interface 110 generates a communication request in response to the actuated (pressed or pat) confirmation key (Step S41). The confirmation key may be a physical key or a simulating key formed through executive software. In some embodiments, the user interface 110 provides an input screen or an operation interface of a conventional mobile phone for the user to input a phone number to be dialed or input a phone number and a message content to be sent.

The processing unit 130 receives the communication request (Step S41), and determines a status of the network card modules 170, 172 according to the communication request (Step S43). In some embodiments, the processing unit 130 starts an automatic checking mechanism in an operating system, so as to check whether the network card modules 170, 172 are installed, and check the status of the network card modules 170, 172.

In some embodiments, the automatic checking mechanism sends a check signal through the processing unit 130 (Step S431), so as to notify the network card modules 170, 172 to reply the status thereof. After the check signal is sent, the processing unit 130 checks whether a response signal is received from the network card module 170 and/or 172 (which is marked as 170/172 in the following) (Step S433), so as to determine whether the network card module 170/172 is installed (Step S435). After the response signal is received, the processing unit 130 obtains the operating status of the corresponding network card module 170/172 (that is, the network card module 170/172 that sends the response signal) (Step S437), so as to determine whether the corresponding network card module 170/172 is enabled or disabled (Step S439).

When the network card module 170/172 is installed and enabled, the processing unit 130 controls the network card module 170/172 to send a network packet (Step S45), and receives a response packet corresponding to the network packet (Step S47), so as to determine whether the network card module 170/172 is connected to the Internet (Step S49).

In some embodiments, the network card modules 170, 172 may be a wireless network card module 170 and a mobile network card module 172. Taking the situation that the mobile device 10 has the wireless network card module 170 and the mobile network card module 172 as an example, when the wireless network card module 170 and the mobile network card module 172 both are installed and enabled, the processing unit 130 may control, at the same time, the wireless network card module 170 and the mobile network card module 172 to send network packets to determine a connection state between the wireless network card module 170 and the Internet and a connection state between the mobile network card module 172 and the Internet. In addition, the processing unit 130 may also first control one of the wireless network card module 170 and the mobile network card module 172 to send a network packet, and when it is determined that the one is not connected to the Internet, the processing unit 130 controls the other one to send the network packet.

Figure 5:
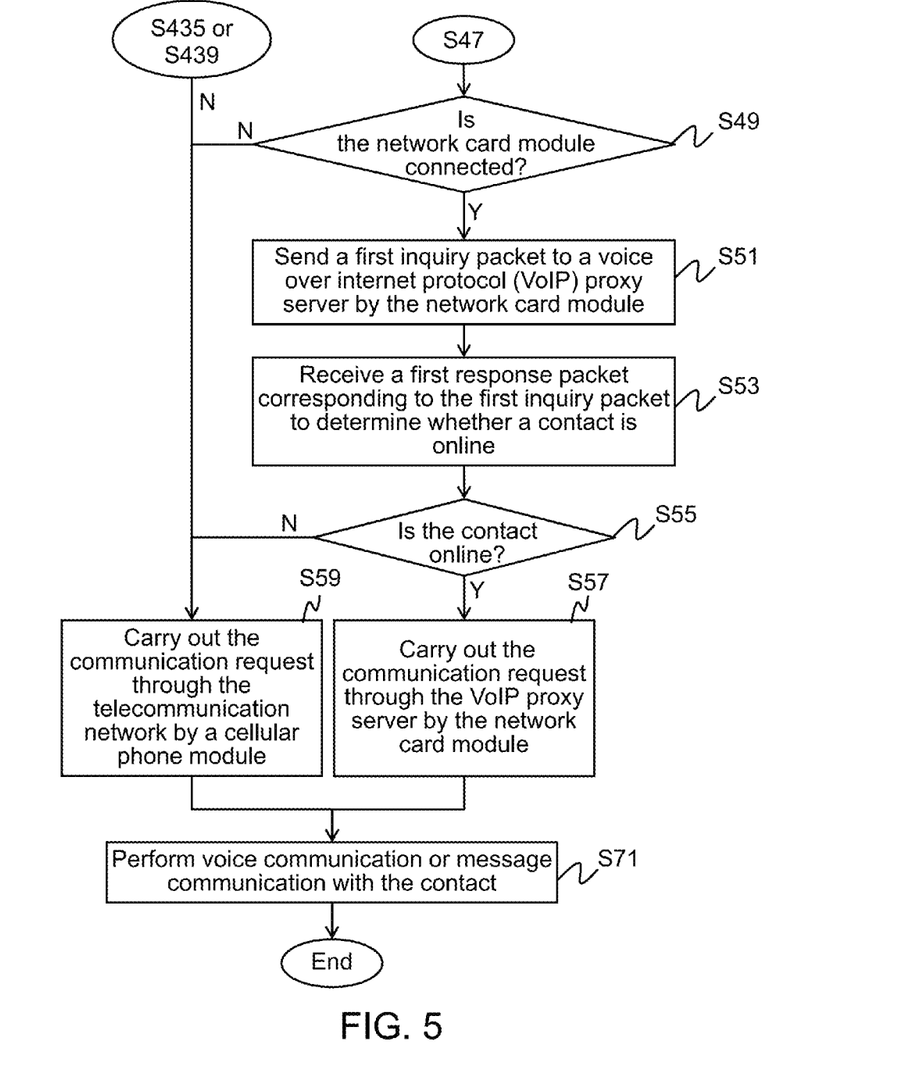

When it is determined that the network card module 170/172 is connected to the Internet, the processing unit 130 controls the network card module 170/172 to send a first inquiry packet to an VoIP (voice over internet protocol) proxy server 30 (Step S51), and receives a first response packet corresponding to the first inquiry packet (Step S53), so as to determine whether the contact to be communicated with is online (Step S55).

When it is determined that the contact is online, the processing unit 130 controls the network card module 170/172 to carry out a communication request through the VoIP proxy server 30 (Step S57), that is, to require to perform voice communication with the corresponding contact or send input message content to the contact according to the input phone number, so as to perform voice communication (making a voice call) or message communication (sending a message) with the contact corresponding to the communication request (Step S71).

Conversely, when the network card module 170/172 is not installed, is not enabled or is not connected to the Internet, or the contact is offline, the processing unit 130 controls the cellular phone module 150 to carry out the communication request through the telecommunication network (a mobile phone base station 20) (Step S59), that is, to require to perform voice communication (dialing the phone numbers), with the corresponding contact or send input message content (for example, text, images, or audio/video), to the contact according to the input phone number, so as to make voice call with or send a message to the contact corresponding to the communication request (Step S71).

Figure 6:
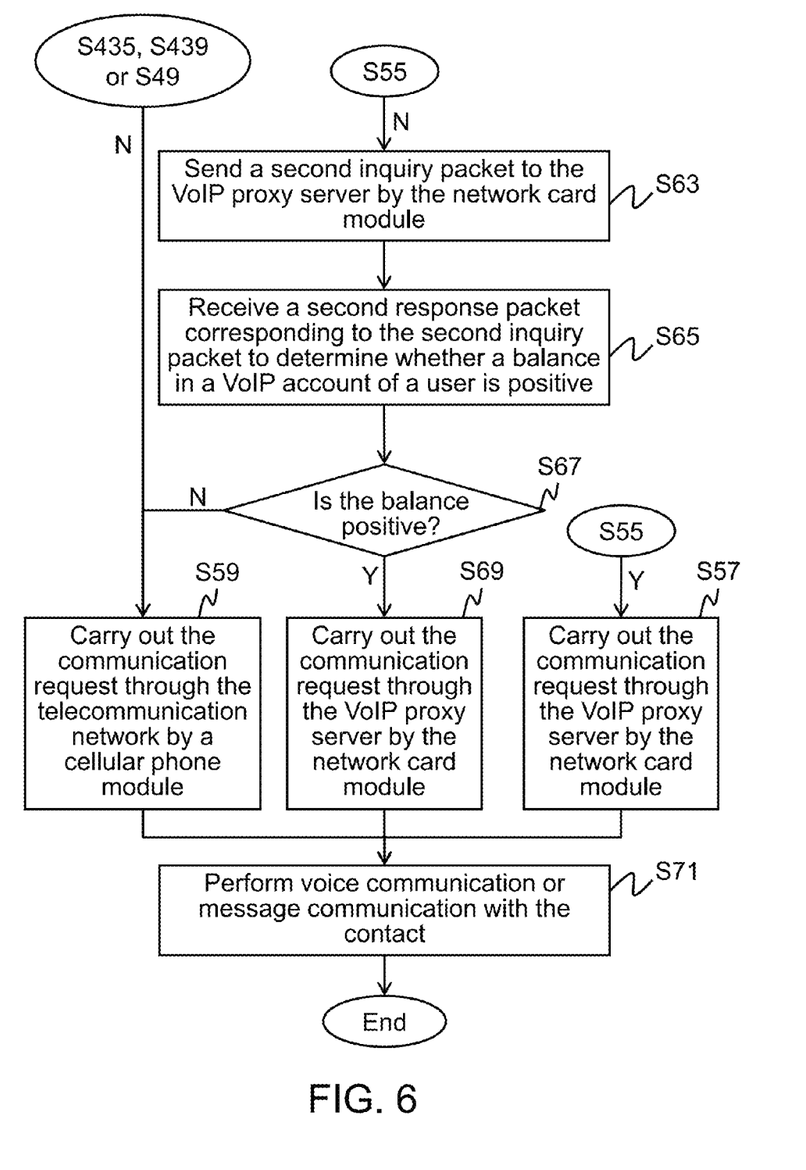
FIG. 6 is a partial flow chart of a method for automatically choosing a communication network according to another embodiment of the present invention.

In another embodiment, please refer to FIG. 6, in which when the contact is offline, the processing unit 130 may first control the network card module 170/172 to send a second inquiry packet to the VoIP proxy server 30 (Step S63), and receive a second response packet corresponding to the second inquiry packet (Step S65), so as to determine whether the balance in an VoIP account of the user is positive (Step S67).

When the balance in the VoIP account of the user is positive, the processing unit 130 controls the network card module 170/172 to carry out the communication request through VoIP proxy server (Step S69), that is, to require to perform voice communication with the corresponding contact or send input message content to the contact on the basis of the input phone numbers, so as to perform voice communication or message communication with the contact corresponding to the communication request (Step S71).

When the balance in the VoIP account of the user is not positive, the processing unit 130 controls the cellular phone module 150 to carry out the communication request through the telecommunication network (the mobile phone base station 20) (Step S59), so as to make a voice call or send a message to the contact corresponding to the communication request (Step S71).

Figure 7:
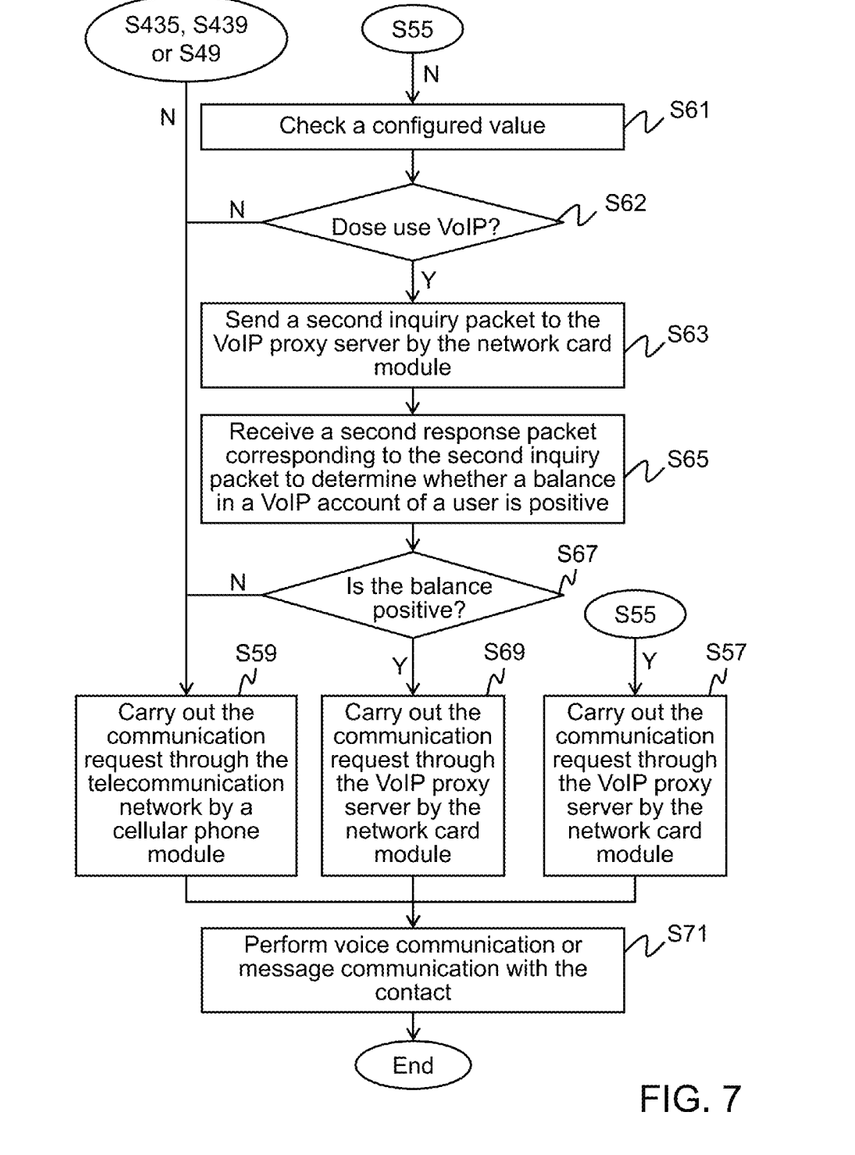
FIG. 7 is a partial flow chart of a method for automatically choosing a communication network according to still another embodiment of the present invention.

In still another embodiment, please refer to FIG. 7, in which when the contact is offline, the processing unit 130 first checks configured value of the mechanism stored in a storage unit 180 (Step S61). When the configured value is set to use the VoIP (Step S62), the processing unit 130 controls the network card module 170/172 to send a second inquiry packet (Step S63). When the configured value is set not to use the VoIP (Step S62), the processing unit 130 controls the cellular phone module 150 to carry out the communication request through the telecommunication network (the mobile phone base station 20) (Step S59), so as to make a voice call or send a message to the contact corresponding to the communication request (Step S71).

In some embodiments, the method for automatically choosing a communication network is implemented by a computer program product, so that the mobile device 10 can implement the method for automatically choosing a communication network according to any embodiment of the present invention after loading a computer program and carrying out the program. In some embodiments, the computer program product may be a readable recording media, and the computer program corresponding to the method for automatically choosing a communication network according to any embodiment of the present invention is stored in the readable recording media for the mobile device 10 to load. In some embodiments, the computer program corresponding to the method for automatically choosing a communication network according to any embodiment of the present invention may be a computer program product, and is transmitted to the storage unit 180 in the mobile device 10 in a wireless manner or in a wired manner.

In some embodiments, the processing unit 130 may be implemented by using one or more processors. The storage unit 180 may be implemented by using one or more storages.

To sum up, the method and a mobile device for automatically choosing a communication network according to the present invention is applicable to a mobile device, so that the mobile device has an automatic judging mechanism; in this way, when the user uses the mobile device to communicate with (i.e. made a voice call with or send a message to), a contact, the automatic judging mechanism determines whether the communication is performed through the Internet or through the telecommunication network, and determines that the communication is performed through the Internet in the case that the mobile device can access the Internet.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for automatically choosing a communication network, comprising:
   receiving a communication request from a user interface;
   determining a status of a network card module according to the communication request by a processing unit;
   sending a network packet through the network card module and receiving a response packet corresponding to the network packet to determine whether the network card module is connected to the Internet;
   sending a first inquiry packet to a voice over Internet protocol (VoIP) proxy server by the network card module and receiving a first response packet corresponding to the first inquiry packet to determine whether a contact corresponding to the communication request is online; and
   sending a second inquiry packet to the VoIP proxy server by the network card module and receiving a second response packet corresponding to the second inquiry packet to determine whether a balance in a VoIP account of a user is positive when the contact is offline;
   wherein the communication request is carried out through the VoIP proxy server by the network card module when the contact is online or the balance in the VoIP account is positive, whereas the communication request is carried out by a cellular phone module when the network card module is not installed, the network card module is not enabled, the network card module is not connected to the Internet, or the balance in the VoIP account is not positive.

2. The method for automatically choosing a communication network according to claim 1, further comprising:
   checking a configured value when the contact is offline;
   wherein the second inquiry packet is sent when the configured value is set to use VoIP, whereas the communication request is carried out by the cellular phone module when the configured value is set not to use the VoIP.

3. The method for automatically choosing a communication network according to claim 1, wherein the step of determining the status of the network card module comprises:
sending a check signal by the processing unit;
checking whether a response signal returned by the network card module according to the check signal is received; and
obtaining the status of the corresponding network card module from the response signal when the response signal is received.

4. The method for automatically choosing a communication network according to claim 1, wherein the communication request is to make a voice call to the contact.

5. The method for automatically choosing a communication network according to claim 1, wherein the communication request is to send a message to the contact.

6. The method for automatically choosing a communication network according to claim 1, wherein the network card module is a mobile network card module or a wireless network card module.

7. The method for automatically choosing a communication network according to claim 1, further comprising:
enabling a confirmation key in the user interface to generate the communication request.

8. The method for automatically choosing a communication network according to claim 7, wherein the confirmation key is a phone dialing key or a message transfer key.

9. A mobile device for automatically choosing a communication network, comprising:
a user interface, for sending a communication request;
a network card module, for determining whether the network card module is connected to the Internet, for determining whether a contact corresponding to the communication request is online, and for determining whether a balance in a VoIP account of a user is positive when the contact is offline; and
a processing unit, for determining a status of the network card module according to the communication request;
wherein the communication request is carried out through a voice over internet protocol (VoIP) proxy server by the network card module when the contact is online or the balance in the VoIP account is positive, whereas the communication request is carried out by a cellular phone module when the network card module is not installed, the network card module is not enabled, the network card module is not connected to the Internet, or the balance in the VoIP account is not positive.

10. The mobile device according to claim 9, wherein the network card module sends a network packet and receives a response packet corresponding to the network packet to determine whether the network card module is connected to the Internet.

11. The mobile device according to claim 9, wherein the network card module sends a first inquiry packet to the VoIP proxy server and receives a first response packet corresponding to the first inquiry packet to determine whether the contact corresponding to the communication request is online.

12. The mobile device according to claim 9, wherein the network card module sends a second inquiry packet to the VoIP proxy server and receives a second response packet corresponding to the second inquiry packet to determine whether the balance in a VoIP account of the user is positive when the contact is offline.

13. The mobile device according to claim 9, wherein the communication request is to send a message or to make a voice call to the contact.

14. The mobile device according to claim 9, wherein the network card module is a mobile network card module or a wireless network card module.

15. The mobile device according to claim 9, further comprising:
a confirmation key, for enabling the communication request.

16. The mobile device according to claim 15, wherein the confirmation key is a phone dialing key or a message transfer key.

* * * * *